(12) United States Patent
Mordukhovich

(10) Patent No.: US 8,157,071 B2
(45) Date of Patent: *Apr. 17, 2012

(54) CLUTCH FOR A TRANSMISSION

(75) Inventor: Gregory Mordukhovich, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 569 days.

This patent is subject to a terminal disclaimer.

(21) Appl. No.: 12/327,707

(22) Filed: Dec. 3, 2008

(65) Prior Publication Data

US 2009/0078527 A1    Mar. 26, 2009

Related U.S. Application Data

(63) Continuation-in-part of application No. 11/780,319, filed on Jul. 19, 2007, now Pat. No. 7,886,885.

(51) Int. Cl.
   *F16D 13/64* (2006.01)
   *F16D 13/74* (2006.01)
   *F16D 69/02* (2006.01)

(52) U.S. Cl. ............. 192/52.6; 192/70.14; 192/107 C; 192/107 M; 192/113.36

(58) Field of Classification Search .......... 192/52.6
   See application file for complete search history.

(56) References Cited

U.S. PATENT DOCUMENTS

| | | | |
|---|---|---|---|
| 1,081,998 A | 12/1913 | Whitcomb | |
| 2,122,405 A | 7/1938 | Bockius et al. | |
| 2,135,126 A * | 11/1938 | Harwood | 192/107 M |
| 2,767,817 A | 10/1956 | Davis | |
| 3,397,761 A | 8/1968 | Lindquist | |
| 3,746,139 A | 7/1973 | Bok et al. | |
| 3,936,552 A | 2/1976 | Krupp et al. | |
| 4,202,432 A | 5/1980 | Komori | |
| 4,291,794 A | 9/1981 | Bauer | |
| 4,473,140 A | 9/1984 | Komori | |
| 4,615,427 A | 10/1986 | Majima | |
| 4,741,424 A | 5/1988 | Kitano et al. | |
| 4,907,677 A | 3/1990 | Yamashita et al. | |
| 5,495,927 A | 3/1996 | Samie et al. | |
| 5,676,577 A | 10/1997 | Lam | |
| 5,998,307 A | 12/1999 | Lam | |
| 6,001,750 A | 12/1999 | Lam | |
| 6,102,443 A | 8/2000 | Lang, Jr. | |
| 6,130,176 A | 10/2000 | Lam | |
| 6,742,637 B2 * | 6/2004 | Ackermann | 192/3.29 |
| 2004/0050646 A1 | 3/2004 | Matthes et al. | |
| 2007/0017769 A1 * | 1/2007 | Mordukhovich et al. | 192/70.12 |
| 2008/0087518 A1 | 4/2008 | Mordukhovich | |
| 2008/0099301 A1 | 5/2008 | Mordukhovich | |
| 2009/0078527 A1 | 3/2009 | Mordukhovich | |

FOREIGN PATENT DOCUMENTS

DE    602 10 172 T2    12/2006
(Continued)

*Primary Examiner* — David D Le
*Assistant Examiner* — Jacob S Scott

(57) ABSTRACT

The clutch of the present invention has a reaction plate, a friction plate, a friction layer, and at least one non-compressible member. The friction plate is disposed adjacent the reaction plate for frictionally engaging the reaction plate to transfer a driving torque between the reaction plate and the friction plate when the compression force is applied. The friction layer has at least one groove. The at least one non-compressible member is disposed in the at least one groove for preventing further compression of the friction layer by the reaction plate. The at least one non-compressible member is adhered to the friction plate or press fit within the friction layer.

26 Claims, 4 Drawing Sheets

(SECTION A-A)

FOREIGN PATENT DOCUMENTS

| | | |
|---|---|---|
| DE | 102007048375 | 4/2008 |
| DE | 102007050413 | 5/2008 |
| DE | 102008039029 | 3/2009 |
| EP | 0 267 027 A2 | 11/1988 |
| WO | WO 2008/054433 A1 | 5/2008 |
| WO | WO2008054433 | 5/2008 |

* cited by examiner

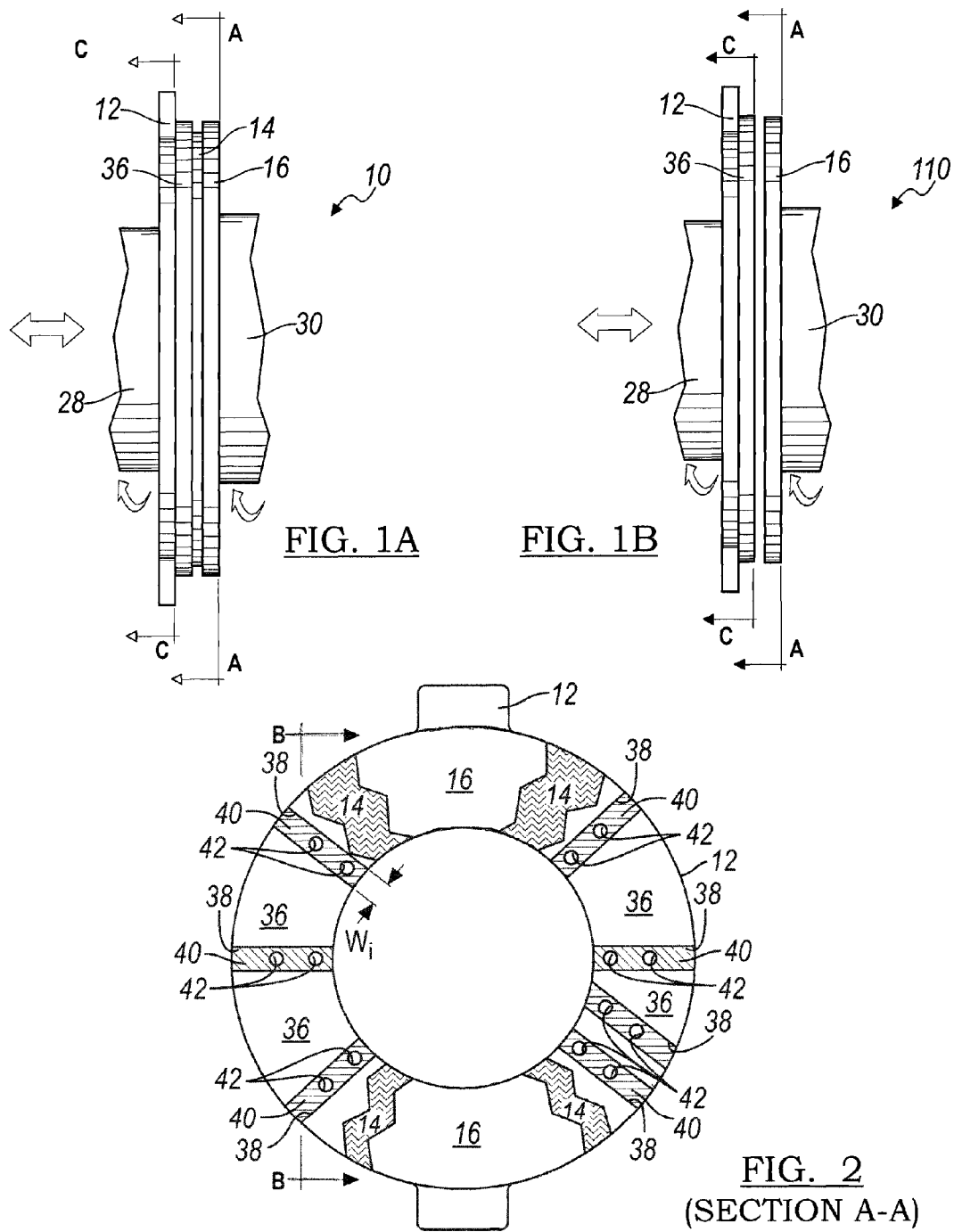

(SECTION B-B)

(SECTION B-B)

(SECTION B-B)

(Section C-C)

(Section D-D)

(Section C-C)

(Section C-C)

(Section C-C)

(Section C-C)

CLUTCH FOR A TRANSMISSION

CROSS-REFERENCE TO RELATED APPLICATIONS

The present application is a continuation-in-part of U.S. application Ser. No. 11/780,319 filed on Jul. 19, 2007, which claims priority from U.S. Provisional Application No. 60/829,554, filed on Oct. 16, 2006. The disclosure of the above application is incorporated herein by reference.

TECHNICAL FIELD

The present invention relates to a torque-transmitting device and to clutches or brakes for controlling the operation of the mechanisms such as transmissions or limited slip differentials.

BACKGROUND

Torque transmitting devices such as clutches or brakes are used throughout the automotive industry. For example, vehicle transmissions employ multiple clutches to engage and disengage the gearsets of the transmission to provide forward and reverse gear ratios.

Generally, a clutch includes a friction plate and a reaction plate. The friction plate has a layer of friction material attached to the surface that opposes the reaction plate. Conventional friction materials are (a) cellulose/Kevlar/resin based materials; (b) sintered metallic fiber friction materials; and (c) woven carbon fiber friction materials.

Cellulose/Kevlar/resin based materials are cost effective, provide high torque capacity, are porous, offer elastic structure capable of excellent load distribution without losing permeability as long as the local load is below the elasticity limits. However, in a wet clutch application, local overloading leads to restricted fluid supply through the porous structure to the surface as result of plastic deformation, closing pores, permeability loss; and since the friction material acts more as thermal insulator, such conditions lead to local overheating, shudder, glazing, structural friction material damage, hot spotting and judder. Heavily relying on friction modifier additives to avoid stick/slip (shudder) behavior may only temporarily produce the desired effects. For example, as the friction modifier additive concentration drops below a critical level due to depletion, the shudder amplitude increases.

Sintered metallic friction materials have much better heat transfer capability and heat resistance and are capable of taking high overload without structural damage. Moreover, an optimized load distribution is achieved by abrasive wear. However, sintered metallic friction materials are less cost effective, since the applied load distribution is slightly different for each engagement. Abrasive wear is much less effective as compared to elastic deformation to avoid the local overloading. Since fluid is squeezed between two solid bodies in a wet clutch application, much higher local fluid pressure (hard-EHL vs. soft-EHL) leads to much higher heat generation as result of fluid shear, so even better heat conductivity may not be enough to support the film, a higher kinematic viscosity fluid may be required (with an additional loss of efficiency) and resulting in a lower torque capacity.

Woven carbon fiber friction materials have benefits and drawbacks that are somewhere in the middle between cellulose/Kevlar/resin based and sintered friction materials.

Thus, there is a need for a new and improved torque transmitting device that takes advantage of the benefits of the above referenced friction materials and limits the disadvantages.

SUMMARY

In an aspect of the present invention, a clutch is provided. The clutch has a reaction plate, a friction plate, a friction layer, and at least one compression limiting member. The reaction plate has a pressing face that exerts a compression force. The friction plate is disposed adjacent the reaction plate for frictionally engaging the reaction plate to transfer a driving torque between the reaction plate and the friction plate when the compression force is applied. The friction layer is attached to the friction plate and opposes the pressing face. The friction layer has a coefficient of friction that is sufficient to prevent relative rotation of the reaction and friction plates when the friction layer is compressed by the reaction plate. The friction layer has at least one groove. The at least one compression limiting member is disposed in the at least one groove for preventing further compression of the friction layer by the reaction plate.

In one aspect of the present invention, the at least one compression limiting member is adhered to the friction plate and a fluid lubricant is disposed between the reaction plate and the friction plate for providing a lubrication barrier between the plates.

In another aspect of the present invention, the friction plate and the at least one compression limiting member include at least one aperture for allowing the fluid lubricant to pass through the friction plate and the at least one compression limiting member to contact the reaction plate.

In yet another aspect of the present invention, the at least one compression limiting member is made primarily of metal.

In yet another aspect of the present invention, the friction layer is made primarily of a porous material that allows the lubricating fluid to move through the friction layer.

In yet another aspect of the present invention, the friction layer is a compressible resilient material that will return to an initial height of the friction layer prior to being compressed by the reaction plate.

In yet another aspect of the present invention, the friction layer is made substantially of a woven carbon fiber.

In yet another aspect of the present invention, the at least one compression limiting member has a height that is less than a thickness of the friction layer before the friction layer is compressed by the reaction plate.

In yet another aspect of the present invention, the at least one compression limiting member has a predefined height that prevents the friction layer from being plastically deformed.

In still another aspect of the present invention, the at least one compression limiting member has a predefined height that is substantially equal to the thickness of the friction material layer after the friction layer has been compressed when the clutch is in a high speed slip operating condition.

In still another aspect of the present invention, the at least one compression limiting member has a predefined height that is greater than the thickness of the friction material layer after the friction layer has been compressed when the clutch is in a low speed slip operating condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 1A is a side view of a torque transmitting device connected between a drive shaft and a driven shaft in accordance with an embodiment of the present invention;

FIG. 1B is a side view of another torque transmitting device connected between a drive shaft and a driven shaft in accordance with an embodiment of the present invention;

FIG. 2 is a partial cutaway view of the torque transmitting device of FIG. 1 in accordance with an embodiment of the present invention;

DESCRIPTION OF THE PREFERRED EMBODIMENTS

Figure 3:
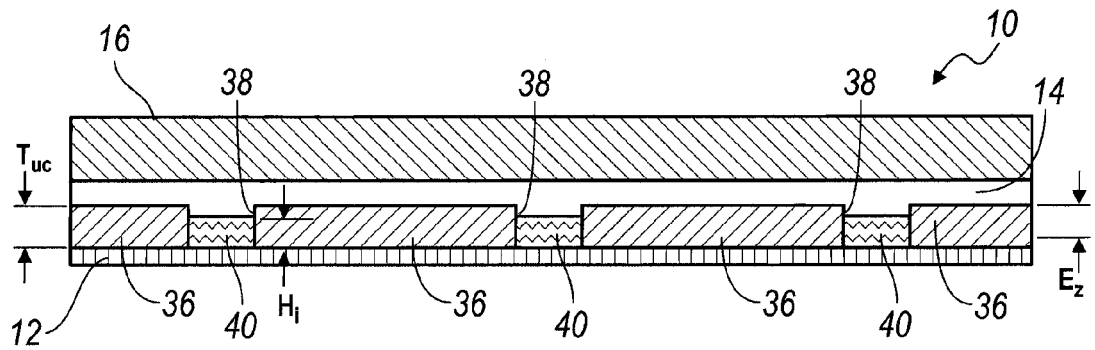
FIG. 3 is a cross-sectional view of the torque transmitting device of FIG. 1A at a location shown in FIG. 2 and in an initial engagement condition in accordance with an embodiment of the present invention.

Referring to the drawings, wherein like reference numbers refer to like components, in FIG. 1A a side view of a torque-transmitting device 10 is illustrated, in accordance with an embodiment of the invention. Torque-transmitting device 10 is commonly referred to in automotive applications as a wet clutch or brake. Torque transmitting device 10 has a first plate or friction plate 12 and a second plate or reaction plate 16. In the embodiment provided, torque transmitting device 10 is a wet clutch wherein friction plate 12 is separated from reaction plate 16 by a layer of lubrication fluid 14. Lubrication fluid 14 disposed between the reaction plate 16 and the friction plate 12 provides a lubrication barrier between the plates 12, 16. Torque-transmitting device 10 is connected between a drive shaft 28 and a driven shaft 30. More specifically, friction plate 12 is coupled to drive shaft 28 and reaction plate 16 is coupled to driven shaft 30. Drive shaft 28 is typically connected to a torque-producing device such as an internal combustion engine (not shown). Driven shaft 30 may be connected to a planetary gearset (not shown) for transmitting a driving torque from the engine to the planetary gearset to drive the road wheels of a vehicle. Both friction plate 12 and reaction plate 16 are planar and have a substantially circular shape. Friction material layer 36 is adhered to a surface of friction plate 12. Further, plates 12 and 16 are made of steel or similar material. However, the teachings of the present invention may be applied to plates made of other materials, such as metal alloys, composites and the like.

In an alternate embodiment, the torque transmitting device of the present invention may be a dry clutch or brake, illustrated in FIG. 1B and generally indicated by reference number 110. Torque transmitting device 110 is similar to torque transmitting device 10, however there is no fluid lubrication layer 14. Instead, the reaction plate directly contacts the friction layer 36 and a compression limiting member or insert member 40 as will be described below.

Turning to FIG. 2, a partial cutaway view of the torque transmitting device 10 of FIG. 1A is illustrated, in accordance with an embodiment of the present invention. In the wet clutch embodiment provided, portions of reaction plate 16 have been removed to reveal the layer of lubrication fluid 14 and a friction material layer 36. It should be appreciated that the dry clutch embodiment of torque transmitting device 110 does not include lubrication fluid 14, but otherwise is similar to the partial cutaway view shown in FIG. 2. Friction material layer 36 is adhered to a surface of friction plate 12. Friction material layer 36 is one of a variety of friction materials currently in use in torque transmitting mechanisms today. For example, in an embodiment of the invention friction material layer 36 is the friction material shown and described in U.S. Pat. No. 5,676,577 issued to Robert Chi-Chiu Lam and Yih Fang Chen and assigned to Borg-Warner Automotive, Inc of Sterling Heights, Mich., and hereby incorporated by reference. Further, friction material layer 36 may be made of a friction material offered by Borg-Warner Automotive, Inc of Sterling Heights, Mich. having the product identification number BW-6500. However, the present invention contemplates that friction material layer 36 is made of cellulose, Kevlar, resin, sintered metal, woven carbon fiber or any combination of these materials in varying percentages by weight that may or may not be in use in clutch applications currently. In the wet clutch embodiment provided, friction material layer 36 is a porous layer that allows lubricating fluid 14 to move through layer 36. In the dry clutch embodiment, friction material layer 36 may be non-porous. Further, friction material layer 36 is a compressible resilient material that will return to its initial height and shape prior to being compressed by reaction plate 16, if layer 36 is not compressed beyond its elastic limit.

In another embodiment of the present invention, grooves 38 are formed in friction material layer 36. The depth of grooves 38 is substantially equal to the thickness of the friction material layer 36. Preferably, at least three grooves are formed in friction material layer 36. However, the present invention contemplates that fewer than three or more than three grooves may be formed in friction material layer 36. Moreover, grooves 38 are spaced apart and disposed circumferentially around friction plate 12. The present invention contemplates that grooves 38 are formed to extend radially out from the center of plate 12 or are disposed on an angle relative to a line passing through the center of plate 12 and extending radially outward.

Further, in a preferred embodiment of the present invention, a ridge or compression limiting member or insert member 40 is placed in each of the grooves 38. Insert member 40 may be employed in a wet clutch as shown in FIG. 1A, or in a dry clutch where there is no layer of lubrication fluid 14 as shown in FIG. 1B. Insert member 40, for example is a separate component that is adhered to friction plate 12. In another embodiment, insert member 40 may be press fit into the grooves 38 and is not directly in contact with friction plate 12. Insert member 40 is made of carbon fiber, steel, a metal alloy or similar material. Insert member 40 must be stiffer than friction material 36. Segments of carbon or carbon fiber with carbon matrix can be attached to friction plate 12 along with the "soft" friction layer 36. In that case the tougher material of insert member 40 will go through some elastic deformation and transfer some torque, while preventing the "soft" friction layer 36 from plastically deforming in wet and dry embodiments, and drastically losing permeability in a wet embodiment. In an embodiment of the present invention, the width $W_i$ of the insert members 40 is no wider than a typical lubrication fluid groove width in a conventional friction plate. Furthermore, width $W_i$ of insert 40 is dimensioned to be sufficient to accommodate any overloading received from clutch engagement.

In the wet clutch embodiment, insert member 40 preferably includes a plurality of apertures 42. Apertures 42 extend through friction plate 12 and are configured to receive and transport lubrication fluid 14 to the interface of the friction plate 12 and reaction plate 16.

Referring now to FIG. 3, a cross-sectional view of the torque transmitting device 10 of FIG. 1A at a location shown in FIG. 2 and at initial engagement is illustrated, in accordance with an embodiment of the present invention. At initial engagement, friction material layer 36 preferably has an uncompressed thickness $T_{uc}$ that is greater than the height $H_i$ of insert members 40. Thus, grooves 38 exist at initial engagement. In the wet clutch embodiment, grooves 38 promote the flow of lubrication fluid 14 through torque transmitting device 10 and work to break through the hydrodynamic film and avoid hydroplaning. In the dry clutch embodiment shown in FIG. 1B, there is no lubrication fluid 14 within the grooves 38. An important characteristic of friction material layer 36 is the elastic property of layer 36. More specifically, friction material layer 36 should have an elastic zone $E_z$ that extends from its uncompressed thickness $T_{uc}$ to just below the height of the insert members 40, as referenced in FIG. 3. When friction material layer 36 is compressed to a thickness such that the top surface of friction material layer 36 is within elastic zone $E_z$, layer 36 will remain resilient and return to its initial thickness when uncompressed. Further, insert members 40 are specifically configured to ensure that friction material layer 36 is not compressed below elastic zone $E_z$ by preventing reaction plate 16 from moving closer to friction plate 12. In other words, friction plate 12 and reaction plate 16 will move towards each other until reaction plate 16 contacts insert members 40 attached to friction plate 12.

Figure 4:
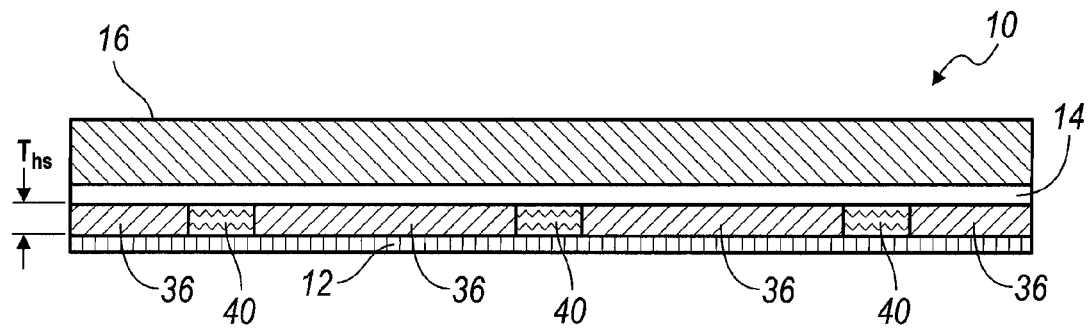
FIG. 4 is a cross-sectional view of the torque transmitting device of FIG. 1A at a location shown in FIG. 2 and in a high speed slip condition in accordance with an embodiment of the present invention.

As shown in FIG. 4, a cross-sectional view of the torque transmitting device 10 of FIG. 1A at a location shown in FIG. 2 and during high speed slip, in accordance with an embodiment of the present invention. As the load on reaction plate 16 reaches its maximum capacity grooves 38 will disappear, friction material layer 36 will transfer the majority of the torque in elastic deformation, and insert members 40 will carry some of the torque. More specifically, during high speed slip friction material layer 36 is compressed such that the thickness $T_{hs}$ of the friction material is substantially equal to the height of insert members 40. In this condition, grooves 38 are no longer present. Insert members 40 have a predefined height $H_i$ that prevents friction material layer 12 from being compressed beyond its elastic deformation range or zone $E_z$. Moreover, insert members 40 will provide parallelism between friction plate 12 and reaction plate 16 resulting in an enhanced load distribution. Further, insert members 40 will absorb any additional temporary loading, thus avoiding friction material plastic deformation. Plastic deformation additionally causes permeability loss in a wet clutch application. In the dry clutch embodiment shown in FIG. 1B, there is no fluid lubrication layer 14 and reaction plate 16 directly contacts friction layer 36 and insert members 40.

Figure 5:
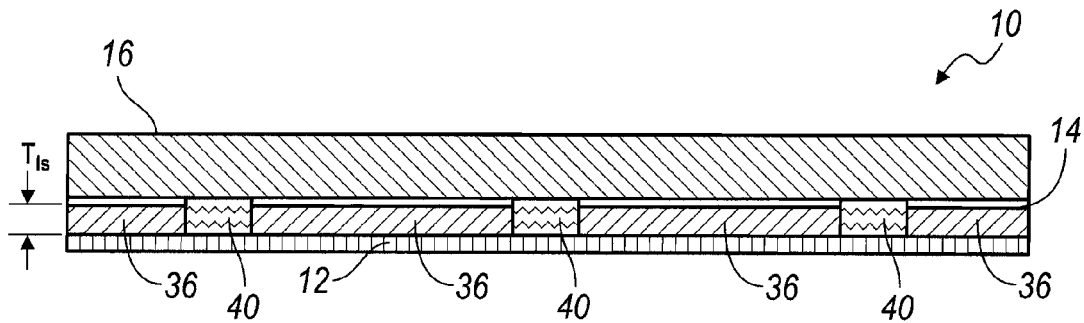
FIG. 5 is a cross-sectional view of the torque transmitting device of FIG. 1A at a location shown in FIG. 2 and in a low speed slip condition in accordance with an embodiment of the present invention.

Reference is now made to FIG. 5, a cross-sectional view of the torque transmitting device 10 of FIG. 1A at a location shown in FIG. 2 and during low speed slip. During low speed slip friction material layer 36 is compressed such that the thickness $T_{ls}$ of the friction material is slightly below the height of insert members 40. In this condition, grooves 38 are no longer present. Moreover, friction material layer 36 is fully compressed and at its elastic deformation limit. If friction material layer 36 were compressed beyond its elastic deformation limit, layer 36 would enter plastic deformation. Friction material layer 36 would lose its resilience if it enters plastic deformation. However, the present invention ensures that friction material layer will not be plastically deformed by providing insert members 40 having a predefined height $H_i$ that prevents reaction plate 16 from further compressing friction material layer 36 beyond its elastic deformation zone $E_z$. In the dry clutch embodiment shown in FIG. 1B, there is no fluid lubrication layer, and friction material layer 36 is only compressed beyond the insert members 40 due to local deflection of reaction plate 16.

Figure 6:
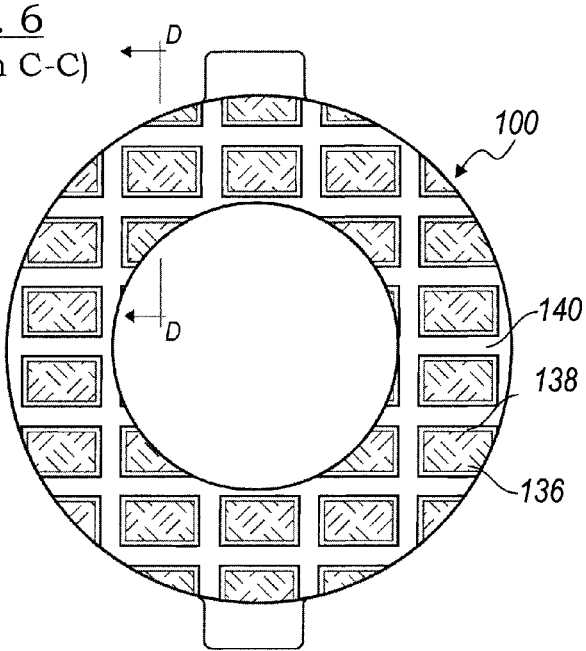
FIG. 6 is a partial cutaway view of another embodiment of a torque transmitting device in accordance with the present invention.
Figure 7:
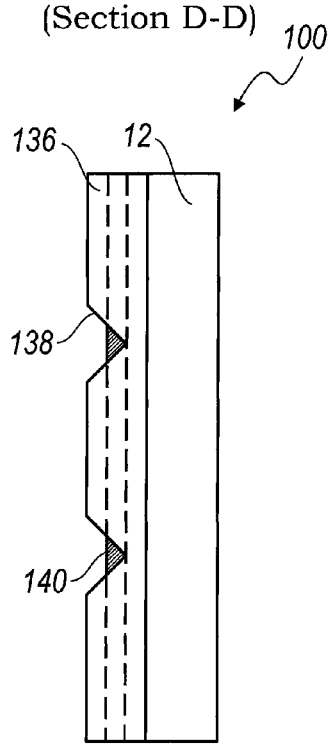
FIG. 7 is a partial cutaway view of the torque transmitting device of FIG. 6 in the direction of arrow D-D.

Turning to FIGS. 6 and 7, an alternate torque transmitting device is generally indicated by reference number 100. Torque transmitting device 100 is similar to torque transmitting device 10 shown in FIG. 1A and torque transmitting device 110 shown in FIG. 1B and like components are indicated by like reference numbers. Torque transmitting device 100 may be either a wet clutch or a dry clutch without departing from the scope of the present invention. Torque transmitting device 100 includes a friction layer 136 and an insert member 140. Friction layer 136 is adhered to friction plate 12 and is similar to friction layer 36 shown in FIGS. 1A and 1B. However, friction layer 136 includes a plurality of grooves 138 disposed in an outer surface of friction layer 136. In the example provided, grooves 138 have a depth less than a thickness of friction layer 136. However, it should be appreciated that grooves 138 may have a depth equal to the thickness of friction layer 136 (i.e. a portion of friction plate 12 is exposed within grooves 138) without departing from the scope of the present invention. Furthermore, in the example provided, grooves 138 have a substantially triangular cross section. However, it should be appreciated that grooves 138 may have a different shape in cross section, such as rectangular or semi-circular, without departing from the scope of the present invention. Grooves 138 are preferably arranged in a substantially square or rectangular grid on the outer surface of the friction layer 136. Insert member 140 is similar to insert member 40 shown in FIGS. 1A and 1B, however, insert member 140 is arranged in a grid to match the arrangement of grooves 138. Insert member 140 is preferably press fit into grooves 138. Alternately, in the embodiment where grooves 138 have a depth equal to the thickness of friction layer 136, insert member 140 may be adhered directly to friction plate 12 within the grooves 138. In the wet clutch embodiment, insert member 140 may include apertures (not shown) to allow lubrication fluid 14 to communicate through insert member 140 and friction plate 12.

Figure 8:
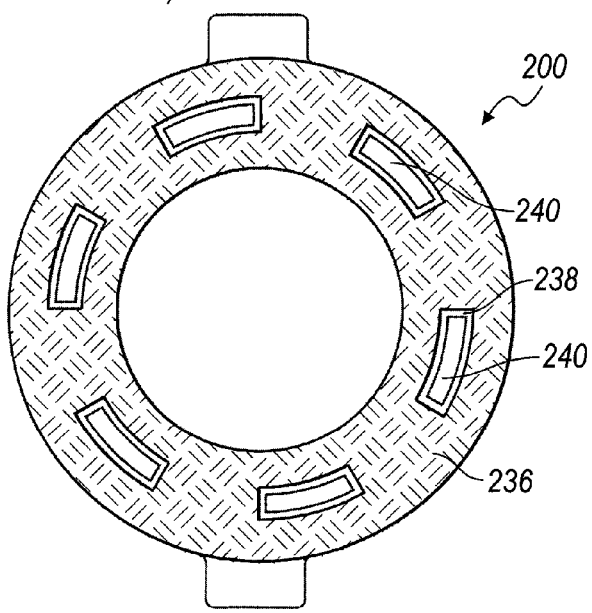
FIG. 8 is a partial cutaway view of yet another embodiment of a torque transmitting device in accordance with the present invention.

Turning to FIG. 8, an alternate torque transmitting device is generally indicated by reference number 200. Torque transmitting device 200 is similar to torque transmitting device 10 shown in FIG. 1A and torque transmitting device 110 shown in FIG. 1B and like components are indicated by like reference numbers. Torque transmitting device 200 may be either a wet clutch or a dry clutch without departing from the scope of the present invention. Torque transmitting device 200 includes a friction layer 236 and a plurality of insert members 240. Friction layer 236 is adhered to friction plate 12 and is similar to friction layer 36 shown in FIGS. 1A and 1B. However, friction layer 236 includes a plurality of grooves 238 disposed in an outer surface of friction layer 236. Grooves 238 may have a depth less than or equal to the thickness of friction layer 236. Grooves 238 are preferably shaped substantially as discrete portions or sectors of a ring disposed at approximately the radial midpoint between the inner and outer diameters of friction layer 236. Each of the grooves 238 are equidistant from one another around the radial midpoint of friction layer 236. Insert members 240 are similar to insert members 40 shown in FIGS. 1A and 1B, however, insert members 240 are shaped as sectors of a ring to match the shape of the grooves 238. Individual insert members 240 are preferably press fit into individual grooves 238. Alternately, in the embodiment where grooves 238 have a depth equal to the thickness of friction layer 236, insert members 240 may be adhered directly to friction plate 12 within grooves 238. In the wet clutch embodiment, insert members 240 may include apertures (not shown) to allow lubrication fluid 14 to communicate through insert members 240 and friction plate 12.

Figure 9:
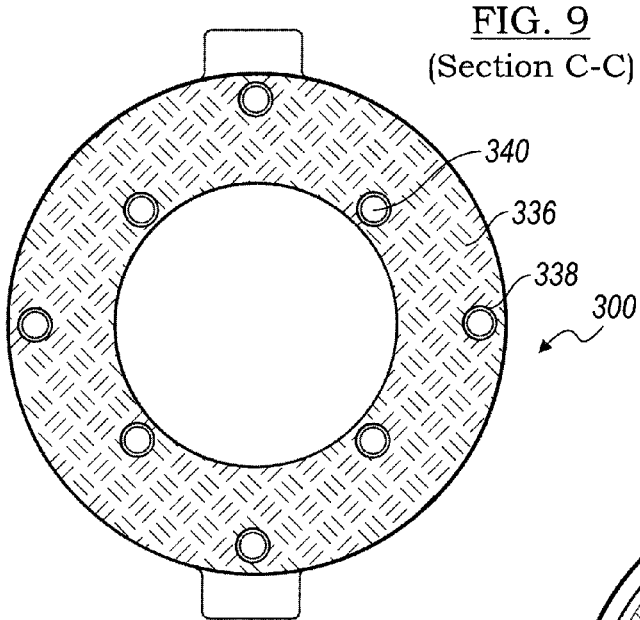
FIG. 9 is a partial cutaway view of yet another embodiment of a torque transmitting device in accordance with the present invention.

Turning to FIG. 9, an alternate torque transmitting device is generally indicated by reference number 300. Torque transmitting device 300 is similar to torque transmitting device 10 shown in FIG. 1A and torque transmitting device 110 shown in FIG. 1B and like components are indicated by like reference numbers. Torque transmitting device 300 may be either a wet clutch or a dry clutch without departing from the scope of the present invention. Torque transmitting device 300 includes a friction layer 336 and a plurality of insert members 340. Friction layer 336 is adhered to friction plate 12 and is similar to friction layer 36 shown in FIGS. 1A and 1B. However, friction layer 336 includes a plurality of grooves 338 disposed in an outer surface of friction layer 336. Grooves 338 may have a depth less than or equal to the thickness of friction layer 336. Grooves 338 are preferably shaped substantially as cylinders located at discrete locations across the outer surface of friction layer 336. Insert members 340 are similar to insert members 40 shown in FIGS. 1A and 1B, however, insert members 340 are shaped as circular posts or cylinders to match the shape of the grooves 338. It should be appreciated, however, that grooves 338 and insert members 340 may take any shape, such as rectangular or triangular, without departing from the scope of the present invention. Individual insert members 340 are preferably press fit into individual grooves 338. Alternately, in the embodiment where grooves 338 have a depth equal to the thickness of friction layer 336, insert members 340 may be adhered directly to friction plate 12 within grooves 338. In the wet clutch embodiment, insert members 340 may include apertures (not shown) to allow lubrication fluid 14 to communicate through insert members 340 and friction plate 12.

Figure 10:
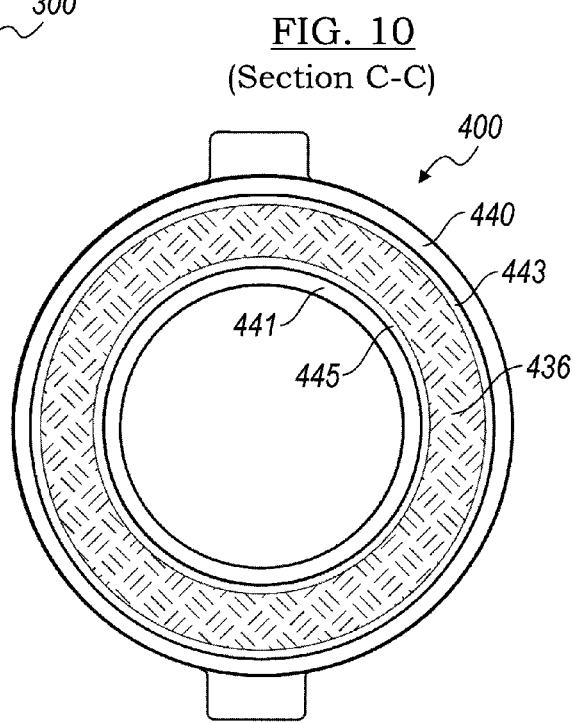
FIG. 10 is a partial cutaway view of yet another embodiment of a torque transmitting device in accordance with the present invention.

Turning to FIG. 10, an alternate torque transmitting device is generally indicated by reference number 400. Torque transmitting device 400 is similar to torque transmitting device 10 shown in FIG. 1A and to torque transmitting device 110 shown in FIG. 1B and like components are indicated by like reference numbers. Torque transmitting device 400 may be either a wet clutch or a dry clutch without departing from the scope of the present invention. Torque transmitting device 400 includes a friction layer 436, an insert member 440, and an insert member 441. Friction layer 436 is adhered to friction plate 12 and is similar to friction layer 36 shown in FIGS. 1A and 1B. However, friction layer 436 is shaped as a ring with an outer diameter less than an outer diameter of friction plate 12 and an inner diameter greater than an inner diameter of friction plate 12. Moreover, friction layer 436 is concentric with friction plate 12. Therefore, an outer portion 443 of the outer surface along the outer diameter of friction plate 12 and an inner portion 445 of the outer surface along the inner diameter of friction plate 12 is not covered by friction layer 436. Insert member 440 is similar to insert member 40 shown in FIG. 1, however, insert member 440 is shaped as a ring and is located overtop outer portion 443 adjacent the outer diameter of friction layer 436. Insert member 441 is similar to insert member 440, however insert member 441 is shaped as a ring and is located overtop inner portion 445 adjacent the inner diameter of friction layer 436. Insert member 440 and insert member 441 are preferably adhered directly to friction plate 12. Alternately, friction layer 436 may include a plurality of grooves (not shown) disposed in an outer surface of friction layer 436. The grooves may have a depth less than or equal to the thickness of friction layer 436. The grooves may be adjacent the inner and outer diameters of the friction material, and insert member 440 and insert member 441 may be adhered to the friction layer 436. In the wet clutch embodiment, insert members 440, 441 may include apertures (not shown) to allow lubrication fluid 14 to communicate through insert members 440, 441 and friction plate 12.

Figure 11:
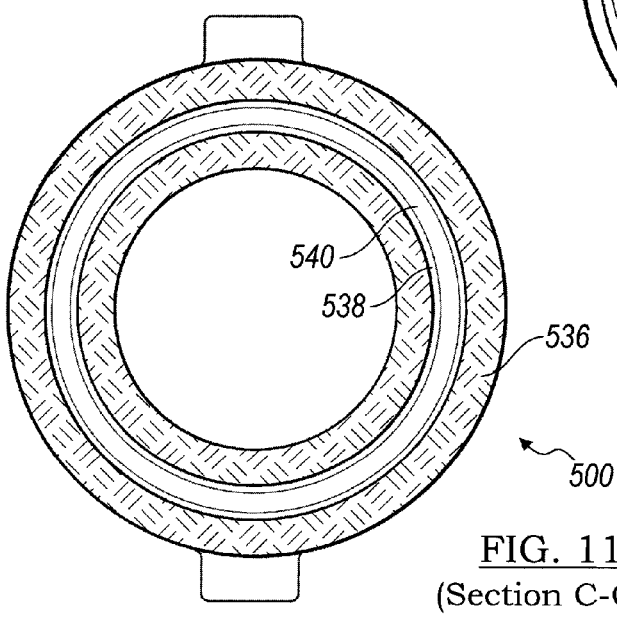
FIG. 11 is a partial cutaway view of yet another embodiment of a torque transmitting device in accordance with the present invention.

Turning to FIG. 11, an alternate torque transmitting device is generally indicated by reference number 500. Torque transmitting device 500 is similar to torque transmitting device 10 shown in FIG. 1A and torque transmitting device 110 shown in FIG. 1B and like components are indicated by like reference numbers. Torque transmitting device 500 may be either a wet clutch or a dry clutch without departing from the scope of the present invention. Torque transmitting device 500 includes a friction layer 536 and an insert member 540. Friction layer 536 is adhered to friction plate 12 and is similar to friction layer 36 shown in FIGS. 1A and 1B. However, friction layer 536 includes a groove 538 disposed in an outer surface of friction layer 536. Groove 538 may have a depth less than or equal to the thickness of friction layer 536. Groove 538 is preferably shaped substantially as a ring disposed at the radial midpoint between the inner and outer diameters of friction layer 536. Insert member 540 is similar to insert member 40 shown in FIGS. 1A and 1B, however, insert member 540 is shaped as a ring to match the shape of the groove 538. It should be appreciated, however, that groove 538 and insert member 540 may be shaped as rings disposed at any radial point of friction layer 536. The insert member 540 is preferably press fit into the groove 538. Alternately, in the embodiment where grooves 538 have a depth equal to the thickness of friction layer 536, insert member 540 may be adhered directly to friction plate 12 within groove 538. In the wet clutch embodiment, insert member 540 may include apertures (not shown) to allow lubrication fluid 14 to communicate through insert member 540 and friction plate 12.

It should be understood that the present invention is not limited to the configurations of insert members 40, 140, 240, 340, 440, 441, and 540 described above. Alternate configurations, including combinations of the embodiments shown in FIGS. 1-11, may be employed so long as local deflection of the reaction plate 16 is limited.

The present invention has many advantages and benefits over the prior art. Moreover, the teachings of the present invention may be employed to overcome many problems found in prior art torque transmitting devices. For example, the present invention at least partially overcomes the problem of shudder and other problems discussed in a technical paper authored by Robert C. Lam, Bulent Chavdar, and Tim Newcomb, *New Generation Friction Materials and Technologies* and published by The Society of Automotive Engineers (Ref. # SAE 2006-01-0150), hereby incorporated by reference.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A torque transmitting device comprising:
   a reaction plate having a pressing face for exerting a compression force;
   a friction plate disposed adjacent the reaction plate;
   a friction layer disposed on the friction plate and having a friction face opposing the pressing face, the friction layer having a coefficient of friction that is sufficient to prevent relative rotation of the reaction and friction plates when the friction layer is compressed by the pressing face; and
   at least one compression limiting member disposed on one of the friction plate and the friction layer, the at least one compression limiting member having a compression surface disposed between the friction face and the friction plate, wherein the at least one compression limiting member limits compression of the friction layer as the pressing face at least partially contacts the at least one compression limiting member, and wherein the at least one compression limiting member has a predefined height, and
   wherein the predefined height of the at least one compression limiting member is at least one of substantially equal to a thickness of the friction layer after the friction layer has been compressed when the torque transmitting device is in a high speed slip operating condition and greater than a thickness of the friction material layer after the friction layer has been compressed when the torque transmitting device is in a low speed slip operating condition.

2. The torque transmitting device of claim 1, wherein the friction layer has at least one groove and the at least one compression limiting member is disposed in the at least one groove.

3. The torque transmitting device of claim 1, wherein the at least one compression limiting member is adhered to the friction plate.

4. The torque transmitting device of claim 1, wherein the friction layer is made substantially of a porous material.

5. The torque transmitting device of claim 1, wherein the friction layer and friction plate have a plurality of fluid apertures.

6. The torque transmitting device of claim 1, wherein the predefined height of the at least one compression limiting member prevents the friction layer from being compressed beyond an elastic limit of the friction layer.

7. The torque transmitting device of claim 6, wherein the predefined height of the at least one compression limiting member is substantially equal to a second thickness of the friction layer after the friction layer has been compressed when the torque transmitting device is in the high speed slip operating condition.

8. The torque transmitting device of claim 6, wherein the predefined height of the at least one compression limiting member is greater than a third thickness of the friction material layer after the friction layer has been compressed when the torque transmitting device is in the low speed slip operating condition.

9. The torque transmitting device of claim 1, wherein the at least one compression limiting member is a radial insert.

10. The torque transmitting device of claim 1, wherein the at least one compression limiting member is a post.

11. The torque transmitting device of claim 1, wherein the at least one compression limiting member has a round cross section and has a surface opposing the pressing face, wherein the surface is chamfered.

12. The torque transmitting device of claim 1, wherein the at least one compression limiting member is a ring shaped member.

13. The torque transmitting device of claim 12, wherein the at least one compression limiting member comprises at least one inner annular ring member and at least one outer annular ring member.

14. The torque transmitting device of claim 1, wherein the at least one compression limiting member is an arcuate member.

15. The torque transmitting device of claim 1, wherein the at least one compression limiting member is formed into a grid.

16. The torque transmitting device of claim 1, wherein the friction layer is made substantially of a woven carbon fiber.

17. The torque transmitting device of claim 1, wherein the at least one compression limiting member is made primarily of metal.

18. A torque transmitting device comprising:
   a reaction plate having a pressing face for exerting a compression force;
   a friction plate disposed adjacent the reaction plate;
   a friction layer disposed on the friction plate and having a friction face opposing the pressing face, the friction layer having a coefficient of friction that is sufficient to prevent relative rotation of the reaction and friction plates when the friction layer is compressed by the pressing face; and
   at least one compression limiting member disposed on one of the friction plate and the friction layer, the at least one compression limiting member having a compression surface disposed between the friction face and the friction plate, the compression surface is at a predefined height that prevents the friction layer from being compressed beyond an elastic limit of the friction layer, wherein the at least one compression limiting member is stiffer than the friction layer, and
   wherein the predefined height of the at least one compression limiting member is at least one of substantially equal to a thickness of the friction layer after the friction layer has been compressed when the torque transmitting device is in a high speed slip operating condition and greater than a thickness of the friction material layer after the friction layer has been compressed when the torque transmitting device is in a low speed slip operating condition.

19. The torque transmitting device of claim 18, wherein the torque transmitting device has at least one fluid aperture through the at least one compression limiting member and the friction plate, wherein the friction layer is made substantially of a porous material.

20. The torque transmitting device of claim 18, wherein the at least one compression limiting member is a radial insert.

21. The torque transmitting device of claim 18, wherein the at least one compression limiting member is a post.

22. The torque transmitting device of claim 18, wherein the at least one compression limiting member has a round cross section and has a surface opposing the pressing face, wherein the surface is chamfered.

23. The torque transmitting device of claim 18, wherein the at least one compression limiting member is a ring shaped member.

24. The torque transmitting device of claim 18, wherein the at least one compression limiting member comprises at least one inner annular ring member and at least one outer annular ring member.

25. The torque transmitting device of claim 18, wherein the at least one compression limiting member is an arcuate member.

26. The torque transmitting device of claim 18, wherein the at least one compression limiting member is grid shaped.

* * * * *